US012649184B2

(12) United States Patent
Fu et al.

(10) Patent No.: US 12,649,184 B2
(45) Date of Patent: Jun. 9, 2026

(54) METHODS FOR PREPARING PREFABRICATED CRACK DEFECT AND BUILT-IN CRACK DEFECT, AND PREFABRICATED MEMBER

(71) Applicants: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

(72) Inventors: Jun Fu, Shanghai (CN); Liming Lei, Shanghai (CN); Yali Li, Shanghai (CN); Xinmin Zhou, Shanghai (CN); Xin Fu, Shanghai (CN)

(73) Assignees: AECC SHANGHAI COMMERCIAL AIRCRAFT ENGINE MANUFACTURING CO., LTD., Shanghai (CN); AECC COMMERCIAL AIRCRAFT ENGINE CO., LTD., Shanghai (CN)

( * ) Notice: Subject to any disclaimer, the term of this patent is extended or adjusted under 35 U.S.C. 154(b) by 902 days.

(21) Appl. No.: 17/920,551

(22) PCT Filed: Dec. 4, 2020

(86) PCT No.: PCT/CN2020/133826
§ 371 (c)(1),
(2) Date: Oct. 21, 2022

(87) PCT Pub. No.: WO2021/212847
PCT Pub. Date: Oct. 28, 2021

(65) Prior Publication Data
US 2023/0141321 A1 May 11, 2023

(30) Foreign Application Priority Data
Apr. 22, 2020 (CN) .......................... 202010319691.7

(51) Int. Cl.
*B22F 10/38* (2021.01)
*B22F 10/25* (2021.01)
(Continued)

(52) U.S. Cl.
CPC .............. *B22F 10/38* (2021.01); *B22F 10/25* (2021.01); *B22F 10/28* (2021.01); *B22F 10/80* (2021.01);
(Continued)

(58) Field of Classification Search
CPC .......... B22F 10/38; B22F 10/25; B22F 10/28; B22F 10/64; B22F 2304/10; B22F 1/065;
(Continued)

(56) References Cited

U.S. PATENT DOCUMENTS 6,251,814 B1 * 6/2001 Kawai ................... C04B 38/085
501/141
2016/0224017 A1 8/2016 Huang et al.
(Continued)

FOREIGN PATENT DOCUMENTS

CN 103600168 A * 2/2014 ............. B23K 26/24
CN 105598449 A 5/2016
(Continued)

OTHER PUBLICATIONS

Zhang et al., "Cracking Mechanism and Susceptibility of Laser Melting Deposited Inconel 738 Superalloy", Materials & Design, The Authors, Elsevier Ltd., Aug. 7, 2019, vol. 183, 14 pages (Year: 2019).*
(Continued)

*Primary Examiner* — Tiffany T Tran
(74) *Attorney, Agent, or Firm* — Maier & Maier, PLLC

(57) ABSTRACT
A method for preparing the prefabricated crack defects includes defining a defect area, defining a volume percentage of the crack defects in the defect area, adjusting the
(Continued)

1

11

10 proportion of spherical powder, the proportion of hollow powder and process parameters of defect preparation according to the volume percentage of the crack defects, based on the technique of laser melting deposition, printing the defect area layer by layer by using the defect preparation powder and the process parameters of defect preparation, wherein the particle size of the defect preparation powder is between 45 μm and 150 μm, the proportion of spherical powder≥93% and the proportion of hollow powder<0.5%, the process parameters of defect preparation including: laser power of 450W-550W, scanning rate of 600 mm/min-1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

13 Claims, 6 Drawing Sheets

(51) Int. Cl.

| | | |
|---|---|---|
| *B22F 10/28* | (2021.01) | |
| *B22F 10/80* | (2021.01) | |
| *B23K 26/342* | (2014.01) | |
| *B33Y 10/00* | (2015.01) | |
| *B33Y 40/20* | (2020.01) | |
| *B33Y 50/00* | (2015.01) | |
| *B22F 10/64* | (2021.01) | |

(52) U.S. Cl.
CPC ............ *B23K 26/342* (2015.10); *B33Y 10/00* (2014.12); *B33Y 40/20* (2020.01); *B33Y 50/00* (2014.12); *B22F 10/64* (2021.01); *B22F 2304/10* (2013.01)

(58) Field of Classification Search
CPC ...... B22F 10/366; B22F 1/052; B22F 1/0655; B22F 10/00; B23K 26/342; B33Y 10/00; B33Y 40/20; B33Y 50/00; B33Y 80/00; B33Y 40/10; B33Y 40/00; B33Y 50/02; B33Y 70/00; C22C 19/055
See application file for complete search history.

(56) References Cited

U.S. PATENT DOCUMENTS

| | | | | |
|---|---|---|---|---|
| 2016/0318247 | A1* | 11/2016 | Schlachter | ............ B29C 64/106 |
| 2017/0145155 | A1* | 5/2017 | Wright | ................. C08G 63/672 |
| 2019/0135705 | A1* | 5/2019 | Yasui | .................... B33Y 80/00 |

FOREIGN PATENT DOCUMENTS

| | | |
|---|---|---|
| CN | 107262716 A | 10/2017 |
| CN | 107368642 A | 11/2017 |
| CN | 107976352 A | 5/2018 |
| CN | 108038325 A | 5/2018 |
| CN | 108195856 A | 6/2018 |
| CN | 110414873 A | 11/2019 |
| CN | 110472355 A | 11/2019 |
| CN | 111036908 A | 4/2020 |
| CN | 111203538 A | 5/2020 |
| CN | 111203539 A | 5/2020 |
| EP | 3575018 A1 | 12/2019 |

OTHER PUBLICATIONS

International Search Report (with English Translation) and Written Opinion (with Machine Translation) issued on Feb. 26, 2021, in corresponding International Application No. PCT/CN2020/133826; 15 pages.
Extended Search Report issued on Apr. 16, 2024, in corresponding European Application No. 20931732.0, 12 pages.
"GH3536 Alloy Powder—MET3DP", https://met3dp.com/product/gh3536-alloy-powder/, Mar. 25, 2024, 13 pages.
"GH 3536 Chemical Information, Mechanical Properties", https://www.tool-die-steels.com/grades/superalloys/42/7777/GH-3536-steel.html, Tools&Die Steels-China's Leading Steel Supplier, Mar. 25, 2024, 3 pages.
Xu et al., "Comparison of Sizing Small Particles Using Different Technologies", Powder Technology, Elsevier Science B.V., Jun. 24, 2023, vol. 132, Nos. 2-3, 9 pages.
Svetlizky et al., "Directed Energy Deposition (DED) Additive Manufacturing: Physical Characteristics, Defects, Challenges and Applications", Materials Today, Elsevier Ltd., Jun. 2, 2021, vol. 49, 25 pages.
Zhang et al., "Cracking Mechanism and Susceptibility of Laser Melting Deposited Inconel 738 Superalloy", Materials & Design, The Authors, Elsevier Ltd., Aug. 7, 2019, vol. 183, 14 pages.
Search Report issued on Apr. 30, 2020, in corresponding Chinese Application No. 202010319691.7, 4 pages.

* cited by examiner

1

11

10

1

11

10

Separate the prefabricated part into the
defect area and the forming area ⟿ S101

Define the volume percentage of the
built-in crack defects in the defect area ⟿ S102

Process the models ⟿ S103

Print the prefabricated part with built-
in crack defects layer by layer ⟿ S104

Heat treatment ⟿ S105

Remove the printed prefabricated part
from substrates ⟿ S106

Surface treatment ⟿ S107

12                                                                12

12a        12a                    12a

METHODS FOR PREPARING PREFABRICATED CRACK DEFECT AND BUILT-IN CRACK DEFECT, AND PREFABRICATED MEMBER

FIELD

The invention relates to the field of additive manufacturing, and in particular to methods for preparing prefabricated crack defects and built-in crack defects, and their prefabricated parts.

BACKGROUND

Additive manufacturing (AM) technology is commonly known as 3D printing (Three-Dimensional Printing) technology. At present, metallic additive manufacturing becomes more and more developed and has been widely applied in the fields of aerospace, medical, automotive, nuclear power, etc. Among them, Laser melting deposition (LMD) technique based on synchronous powder feeding is a common additive manufacturing technology, where powder is transported by carrier gas to converge into spherical powder, high-energy laser beams are used to melt the metal powder which is transported and converged simultaneously, forming moving metal molten pools in an unstable state, the small molten pools solidify rapidly due to the large temperature gradient, melts and accumulates layer by layer, and finally forms into a solid part. This technology is generally applied in rapid formation of large complex metal structures of aerospace and defense equipment with low cost and short cycle, or rapid repair of high value-added components, such as aero engine installation section system, rear section platform, integral blisk, turbine blades and other parts.

The metal forming/repairing process of laser melting deposition based on synchronous powder feeding involves the coupling of multiple fields such as temperature field and stress field, which is a complex process of non-equilibrium solidification with many factors of instability. The occurrences of defects of different types and sizes are inevitable, pores, cracks, and lack of fusion can be commonly found. Due to the anisotropic structure and performance of additive manufacturing workpiece, and the differences from traditional casting, forging, welding and other workpieces, the defects generated are also different. The defect detection and evaluation methods in prior art are basically not suitable for additive manufacturing. Therefore, preparing additive manufacturing standard part with defects, defect sample or defect part can not only prepare for the accurate non-destructive testing of defects, but also carry out qualitative and quantitative research accurately on the defects generated in additive manufacturing, simulating the impact of different types or sizes of defects on the mechanical properties of the metallic additive manufacturing forming/repairing parts accurately, to further study and verify the impact of defects on the reliability of additive manufacturing parts, which is of great significance to the application of additive manufacturing parts in aerospace and other fields.

Crack defect is a crack caused by the destruction of the atomic bond and formation of a crack on the new interface in the material. Generally, crack defects on the surface of components are easy to detect and observe. However, as to crack defects inside the components, due to the effect of stress concentration on the crack tip, crack would initiate and propagate, which would significantly degrade the mechanical performance of the material and affect the service life of the part severely. To prepare the metal workpiece with built-in crack defects, there are three methods currently. The first one is to use a fatigue testing machine to perform fatigue tests to produce crack defects with a specific size. The second one is to cut cracks with plasma or other high-energy beams, and then weld together. The third one is by using selective laser melting (SLM) to 3D print the designed contour and size of the crack defects directly and form the workpiece with the feature of crack defect inside directly. The workpiece with crack defects prepared by the first and second methods has caused different degrees of damage to the structure and performance to the workpiece. The workpiece with crack defects prepared by the third method not only damage the continuity of the structure, but also may be likely to cause the powder with tens of microns in diameter to be left in the crack if the width of the crack is relatively large, or the crack is likely to be filled with the molten metal of the boundary contour if the width of the crack is relatively small and cracks cannot be formed. The above-mentioned three methods cannot simulate the features of crack defects generated during the solidification process of the workpiece accurately, cannot represent the features of the structure of the crack defects accurately and cannot evaluate the relationship between defects and mechanical properties accurately and effectively.

SUMMARY

One object of the present invention is to provide a method for preparing prefabricated crack defects, where the position and proportion of the defects generated in the prefabricated part can be controlled effectively.

Another object of the present invention is to provide a method for preparing a prefabricated part with built-in crack defects, where the relationship between the crack defects inside the prefabricated part and the mechanical performance of the prefabricated part can be evaluated effectively.

Another object of the present invention is to provide a prefabricated part with built-in crack defects, where the prefabricated part is prepared by the foregoing method.

Another object of the present invention is to provide a method for preparing a repaired part with built-in crack defects, where the relationship between the crack defects inside the repaired part and the mechanical performance of the repaired part can be evaluated effectively.

In order to achieve the above-mentioned object, the method for preparing prefabricated crack defects comprises:
   defining a defect area,
   defining a volume percentage of the crack defects in the defect area,
   adjusting the proportion of spherical powder, the proportion of hollow powder and process parameters of defect preparation according to the volume percentage of the crack defects, based on the technique of laser melting deposition, printing the defect area layer by layer by using the defect preparation powder and the process parameters of defect preparation,
   wherein the particle size of the defect preparation powder is between 45 $\mu m$ and 150 $\mu m$ the proportion of spherical powder 93% and the proportion of hollow powder<0.5%,
   the process parameters of defect preparation comprising: laser power of 450 W-550 W, scanning rate of 600 mm/min-1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

In one or more embodiments, the method for preparing the prefabricated crack defects is controlled by that: the volume percentage of the crack defects in the defect area is controlled by adjusting the ratio of the laser power P to the scanning rate v, wherein the ratio of P/v decreases, the volume percentage of the crack defects in the defect area would increase.

In order to achieve another above-mentioned object, the method for preparing a prefabricated part with built-in crack defects, based on the technique of laser melting deposition, comprises:

obtaining a 3D model of the prefabricated part, separating the prefabricated part into at least one defect area and one forming area, where the defect area is provided inside the prefabricated part, defining a volume percentage of the built-in crack defects in the defect area, adjusting the proportion of spherical powder, the proportion of hollow powder and process parameters of defect preparation according to the volume percentage of the crack defects, printing the prefabricated part with built-in crack defects layer by layer, where the defect preparation powder and the process parameters of defect preparation are used to print the specific layers relative to the defect area, wherein the particle size of the defect preparation powder is between 45 µm and 150 µm, wherein the proportion of spherical powder≥93% and the proportion of hollow powder<0.5%, the process parameters of defect preparation comprising: laser power of 450 W-550 W, scanning rate of 600 mm/min-1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

In one or more embodiments, the 3D model of the prefabricated part is separated into a plurality of defect areas and forming area, wherein the proportion of spherical powder, the proportion of hollow powder and the process parameters of defect preparation are set separately for each defect area.

In one or more embodiments, the method for preparing the prefabricated part with built-in crack defects comprises that: the volume percentage of the crack defects in the defect area is controlled by adjusting the ratio of the laser power P to the scanning rate v, wherein the ratio of P/v decreases, the volume percentage of the crack defects in the defect area would increase.

In one or more embodiments, the method for preparing the prefabricated part with built-in crack defects further comprises that:

processing the 3D models of the defect area and the forming area, where model processing comprises:

allowance addition processing, layer separation and cutting processing, and path planning processing.

In one or more embodiments, the method for preparing the prefabricated part with built-in crack defects further comprises that:

heat treatment of the printed prefabricated part, removing the printed prefabricated part from substrates, and surface treatment of the printed prefabricated part.

In order to achieve another above-mentioned object, the prefabricated part with built-in crack defects is prepared by the foregoing method.

In order to achieve another above-mentioned object, the method for preparing a repaired part with built-in crack defects, based on the technique of laser melting deposition, the repaired part comprises a part body and a repair area, the repair area is used to repair a defect or damage of the part body, the method comprises:

obtaining a 3D model of the part body and the repair area respectively, obtaining the part body, separating the 3D model of the repair area into at least one defect area and one forming area, where the defect area would be provided inside the repaired part after being repaired, defining a volume percentage of the built-in crack defects in the defect area, adjusting the proportion of spherical powder, the proportion of hollow powder and process parameters of defect preparation according to the volume percentage of the crack defects, printing the repair area on the defect of the part body layer by layer, where the defect preparation powder and the process parameters of defect preparation are used to print the specific layers relative to the defect area, wherein the particle size of the defect preparation powder is between 45 µm and 150 µm wherein the proportion of spherical powder 93% and the proportion of hollow powder<0.5%, the process parameters of defect preparation comprising: laser power of 450 W-550 W, scanning rate of 600 mm/min-1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

In one or more embodiments, the method for preparing the repaired part with built-in crack defects comprises:

the volume percentage of the crack defects in the defect area is controlled by adjusting the ratio of the laser power P to the scanning rate v, wherein the ratio of P/v decreases, the volume percentage of the crack defects in the defect area would increase.

In one or more embodiments, the defect of the part body includes casting defects, machining defects or service defects, and the method further comprises:

slotting a complete part to obtain the part body.

In one or more embodiments, the method for preparing the repaired part with built-in crack defects further comprises:

processing the 3D models of the defect area and the forming area of the repair area, where model processing comprises:

allowance addition processing, layer separation and cutting processing, and path planning processing.

In one or more embodiments, the method for preparing the repaired part with built-in crack defects further comprises:

heat treatment of the printed repaired part, and surface treatment of the printed repaired part.

The advantages of the invention are that: simulation of crack defects inside the repaired part with built-in crack defects is achieved in the embodiment mentioned above, so that the repaired part with crack defects generated naturally can be obtained, to further analyze the relationship between the built-in crack defects and the reliability of the repaired part prepared by additive manufacturing, providing a strong theoretical support for the application of metallic additive manufacturing formation, which has a broad research and application prospect.

BRIEF DESCRIPTION OF THE DRAWINGS

The specific features and performance of the present invention are further described by the following embodiments and drawings.

DETAILED DESCRIPTION

Figure 1:
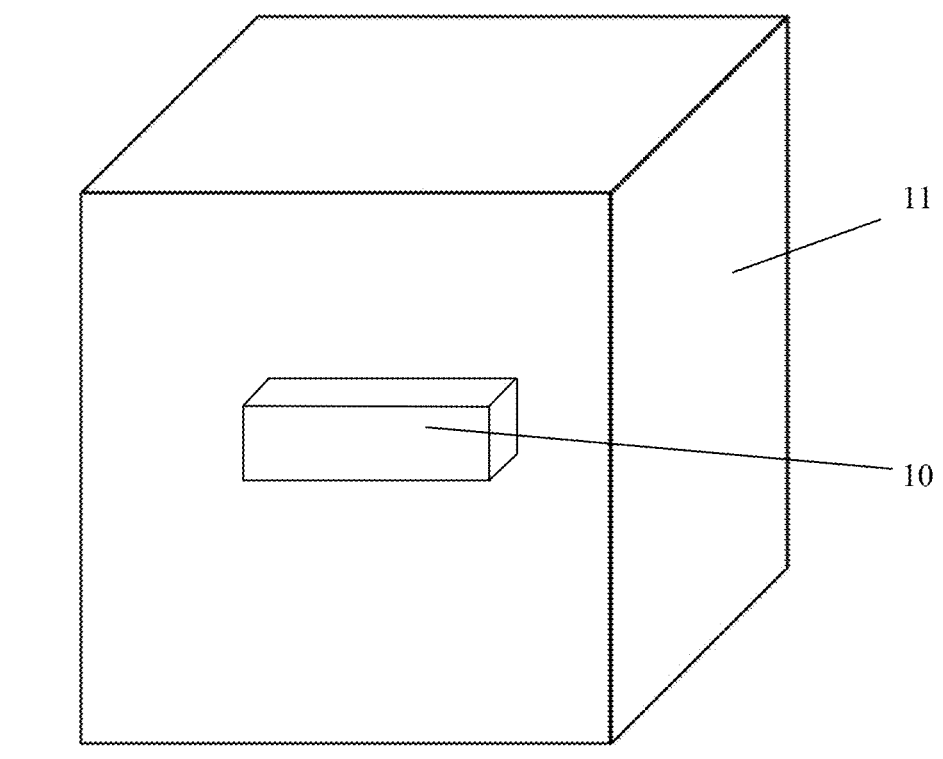
FIG. 1 schematically shows a schematic view of a prefabricated part with built-in crack defects in one embodiment.

A variety of different embodiments for implementing the subject technical solution are disclosed as below. To simplify the disclosure, specific examples of each element and arrangement are described as below. Surely, these embodiments are only examples and are not intended to limit the scope of protection of the present application. For example, the first feature described later in the specification is formed above or on the second feature, and it may comprise an embodiment in which the first and second features are formed by direct connection, or it may comprise an embodiment in which additional features are formed between the first and second features so the first and second features may not be connected directly. In addition, reference numerals and/or letters may be repeated in different embodiments of the disclosure. The repetition of reference numerals and/or letters is for brevity and clarity, and does not indicate the relationship between the various embodiments and/or structures to be discussed. Further, when the first element is described in the manner of being connected or combined with the second element, the description comprises the embodiment in which the first and second elements are directly connected or combined with each other, and also comprises the use of one or more other intervening elements to be added so that the first and second elements are connected or combined with each other indirectly.

It should be noted that in the case of using up, down, left, right, front, back, top, bottom, positive, negative, clockwise and counterclockwise in the following description are only used because of convenience, does not imply any specific fixed direction. In fact, they are used to reflect the relative position and/or orientation between the various parts of the object.

It should be noted that these and other subsequent drawings are only examples, they are not sketched to scale, and should not be taken as limiting the scope of protection actually required by the present invention. In addition, the conversion of methods in different embodiments can be combined appropriately.

One aspect of the invention is to provide a method for preparing prefabricated crack defects. The preparation of crack defects is achieved by the following steps.

Firstly, defining the defect area, it should be understood that the defect area mentioned in this disclosure refers to the region where the crack defects would be prefabricated, which can be a portion of the part to be printed, such as a partial area on the surface of the part or a partial area inside the part, or the whole part, such that the whole part is considered as the defect area.

Subsequently, defining the volume percentage of the crack defects in the defect area, and adjusting the proportion of spherical powder, the proportion of hollow powder and the process parameters of defect preparation according to the volume percentage of the crack defects.

Subsequently, based on the technique of laser melting deposition, printing the defect area layer by layer by using the defect preparation powder and the process parameters of defect preparation. It should be understood that the defect preparation powder mentioned in this disclosure refers to the specific powder used to print the defect area, and the process parameters of defect preparation refers to the specific printing parameters used to print the defect area. Specifically, the type, chemical composition and physical properties of the defect preparation powder can be the same as or different from the powder used to normal print the forming area, and the powder preparation process can be the same or different, that is the same powder can be used for the defect area and the forming area as long as the preparation process is different. The defect preparation powder and the process parameters of defect preparation are described in detail as following.

The particle size of the defect preparation powder is between 45 $\mu$m and 150 $\mu$m, wherein the proportion of spherical powder$\geq$93% and the proportion of hollow powder<0.5%. It should be noted that the particle size mentioned in this disclosure refers to the size of the powder particles, the particle size of a spherical powder particle is generally expressed by its diameter. For an irregular-shaped particle, the diameter of a spherical particle which has the same behavior as the irregular-shaped particle can be regarded as the equivalent diameter of that particle. The distribution of particle size of the powder can be measured by the dry sieving method or the wet method with a laser particle size analyzer. The proportion of spherical powder refers to the ratio of the amount of the spherical powder to the total amount of the defect preparation powder. The powder particles of the powder materials used for additive manufacturing have various shapes, such as the spherical powder with a spherical shape and a smooth surface, or the satellite powder which is formed by two or more spherical powder particles bonded together, with a protruding structure on the surface and a rough spherical shape, or other irregular-shaped powder such as the powder in the shape of a stripe, a rod, a sheet, etc. The proportion of hollow powder refers to the ratio of the amount of the hollow powder to the total amount of the defect preparation powder, those powder used as powder materials for additive manufacturing with pores inside and hollow shape is named as hollow powder. It should be understood that the proportion of spherical powder to the defect preparation powder depends on the outer contour of the powder particles, while the proportion of hollow powder to the defect preparation powder depends on whether the powder particles have pores inside and be in a hollow shape.

The process parameters of defect preparation comprises: laser power of 450 W-550 W, scanning rate of 600 mm/min- 1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

The volume percentage of the crack defects in the defect area is controlled by adjusting the process parameters of defect preparation. It should be understood that the volume percentage of the crack defects in the defect area mentioned in this disclosure refers to the ratio of the volume of the crack defects to the volume of the defect area.

Specifically, in one embodiment, the volume percentage of the crack defects in the defect area is controlled by adjusting the ratio of the laser power P to the scanning rate v, where the ratio of P/v decreases, the volume percentage of the crack defects in the defect area would increase, therefore the volume percentage of the crack defects in the defect area could be larger by reducing the ratio of the laser power to the scanning rate. In another embodiment, the method of adjusting the process parameters of defect preparation is determined by trial and error, for example, the parameter A is adjusted in the N+1th test, the volume percentage of the crack defects prepared in the N+1th test tends to increase compared to the volume percentage of the crack defects prepared in the Nth test, therefore the calibrated volume percentage can be obtained by adjusting the parameter A continuously. In another embodiment, a parameter database can also be provided to record the change in the proportion of the crack defects after each time the process parameters of defect preparation is adjusted, so that a certain proportion of the crack defects can be obtained by referring to the database to adjust the process parameters of defect preparation. When the prefabricated volume percentage of the crack defects in the defect area is in the range of 0.01%-1.5%, the relationship between the volume percentage of the crack defects in the defect area and the P/v ratio is as follows:

$$\text{The volume percentage of the crack defects in the}$$
$$\text{defect area} = -0.0141 \ln(P/v) + 0.001.$$

The crack defects prepared by this method are naturally generated during the printing process, which can retain the feature of continuity corresponding to structure of the crack region, and a specific proportion of crack defects could be obtained by adjusting the process parameters of defect preparation, providing a basis for further discussion on the relationship between the crack defects and the impact on mechanical properties.

In order to further embody the method for preparing crack defects, the first and second embodiments are shown as follows to illustrate the specific method for cracks preparation.

The First Embodiment

The first embodiment shows a method for preparing a prefabricated part with built-in crack defects and the prefabricated part with built-in crack defects prepared using this method. It should be understood that the built-in crack defect refers to the crack defect produced inside the prefabricated part.

Figure 2:
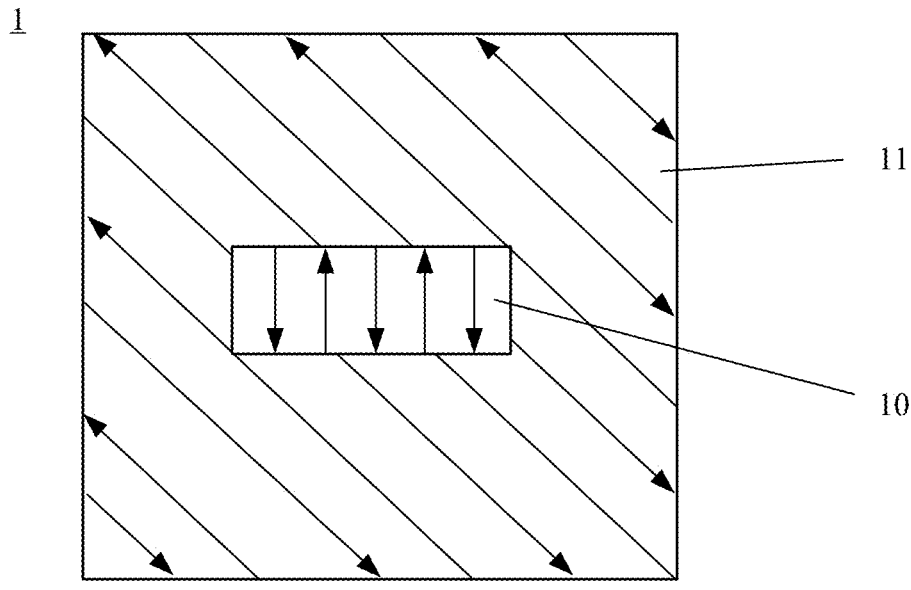
FIG. 2 schematically shows a schematic view of the cross section of the prefabricated part including the defect area and the forming area.
Figure 3:
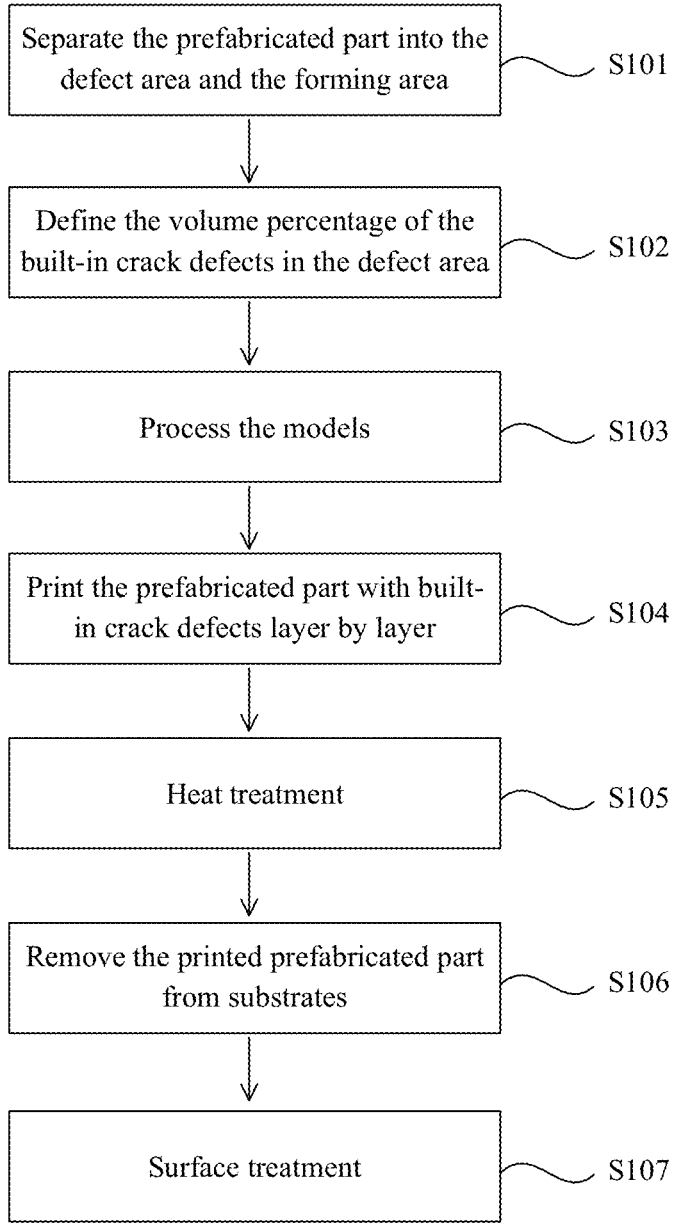
FIG. 3 is a flow chart of the method for preparing the prefabricated part shown in FIG. 1.

FIG. 1 schematically shows a schematic view of the prefabricated part with built-in crack defects in this embodiment, FIG. 2 schematically shows a schematic view of the cross section of the prefabricated part including the defect area and the forming area, FIG. 3 is a flow chart of the method for preparing the prefabricated part shown in FIG. 1.

Referring to FIG. 1 and FIG. 3, in order to prepare the prefabricated part 1 shown in FIG. 1, firstly execute S100:

obtain a 3D model of the prefabricated part 1, specifically, the 3D model of the prefabricated part 1 for additive manufacturing can be obtained by means of 3D scanning etc., the 3D model can be created in 3D graphics processing software such as UG, AUTOCAD or other modeling software.

S101 is executed subsequently: separate the prefabricated part 1 into the defect area 10 and the forming area 11, the forming area 11 mentioned in this disclosure refers to the rest portion of the part excluding the defect area 10. FIG. 1 only exemplarily shows one defect area 10 separated from the prefabricated part 1, it should be understood that the amount of the defect area 10 can be two or more. In this embodiment, the portions of the prefabricated part 1 excluding the defect area 10 can all be regarded as the forming area 11.

The defect area 10 is provided inside the prefabricated part 1, it should be understood that, built-in crack defects are generated inside the structure of the part in the actual printing process, so the preparation of the prefabricated part 1 with built-in crack defects can be achieved by setting the defect area 10 inside the prefabricated part 1.

Subsequently, execute S102: define the volume percentage of the built-in crack defects in the defect area 10, the volume percentage can be determined by the ratio of the volume of the built-in crack defects in the actual printed part that needs to be simulated to the volume of the actual printed part, that is (the volume of the built-in crack defects/the volume of the defect area)*the volume of the defect area/the volume of the prefabricated part=the volume of the built-in crack defects in the actual printed part/the volume of the actual printed part. If the amount of the defect area 10 in the prefabricated part 1 is larger than one, by separating the prefabricated part 1 into the defect area 10 and the forming area 11 in step S101, the defects in the prefabricated part 1 could be prepared quickly and accurately according to the actual volume percentage. At the same time, the proportion of spherical powder, the proportion of hollow powder and the process parameters of defect preparation can be adjusted according to the volume percentage of the defects.

Subsequently, execute S104: print the prefabricated part 1 with built-in crack defects layer by layer. FIG. 2 schematically shows a schematic view of the cross section of the prefabricated part including the defect area and the forming area, as shown in FIG. 2, for each cross section, the defect preparation powder and the process parameters of defect preparation are used to print the specific layers in the defect area 10, the powder for forming and relevant process parameters are used to print the specific layers in the forming area 11.

Specifically, the particle size of the defect preparation powder is between 45 μm and 150 μm, wherein the proportion of spherical powder 93% and the proportion of hollow powder<0.5%. In one embodiment, the defect preparation powder is prepared by the plasma rotating electrode atomization method.

The process parameters of defect preparation comprise: laser power of 450 W-550 W, scanning rate of 600 mm/min-1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

The volume percentage of the crack defects in the defect area is controlled by adjusting the process parameters of defect preparation. Specifically, in one embodiment, the volume percentage of the crack defects in the defect area is controlled by adjusting the ratio of the laser power to the powder feeding rate. In another embodiment, the method of adjusting the process parameters of defect preparation is determined by trial and error, for example, the parameter A is adjusted in the N+1th test, the volume percentage of the crack defects prepared in the N+1th test tends to increase compared to the volume percentage of the crack defects prepared in the Nth test, therefore the calibrated volume percentage can be obtained by adjusting the parameter A continuously. In another embodiment, a parameter database can also be provided to record the change in the proportion of the crack defects after each time the process parameters of defect preparation is adjusted, so that a certain proportion of the crack defects can be obtained by referring to the database to adjust the process parameters of defect preparation.

The built-in crack defects can be naturally generated in each layer of the defect area 10 printed using the above-mentioned defect preparation powder and the process parameters of defect preparation, thereby realizing the natural formation of crack defects in the prefabricated part 1. Since the crack defects formed by this method have the feature of the actual solidification process of metal, the feature of continuity corresponding to structure of the crack region can be retained in the crack defects. Meanwhile, the location of the area where crack defects are generated can be controlled by separating the defect area and the forming area, compared with the prior art, this method can provide the crack defects generated by a more accurate simulation of the solidification process of laser melting deposition, without damaging the structure and performance of the workpiece.

The prefabricated part with built-in crack defects prepared by this method is advantageous for the analysis of the true correspondence between the crack defects produced by laser melting deposition additive manufacturing and the signals of non-destructive testing. Combined with the test results of the product performance, the relationship between the crack defects and the product performance could be analyzed and researched. Further, the relationship between the built-in crack defects and the reliability of the product of additive manufacturing could be analyzed, providing a strong theoretical support for the application of metallic additive manufacturing formation, which has a broad research and application prospect.

In one or more embodiments, a plurality of defect areas 10 could be provided, so the 3D model needs to be separated into a plurality of defect areas and forming area in step S101, and the proportion of spherical powder, the proportion of hollow powder and the process parameters of defect preparation needs to be set separately for each defect area in step S102. The technical problem of controlling the position and feature of the defect area and the defects in the prefabricated part in defect preparation can be solved by setting parameters for the defect area. The defect area is designed to simulate the defects and features of the actual part, so the proportion of defects, the size of defects and the intensity of defects in different defect areas are controlled, and partition enables that defects with different features could be obtained on different position on one part. Concentration of defects often occurs during the forming process or preparing process of the parts, so preparing a single defect cannot actually show the overall concentration of defects and the structure features of the defects and their surroundings, and cannot show the actual defects prepared effectively. Using the defect area to simulate the generation of defects and their features can not only simplify the method for preparing prefabricated defects, making it more convenient to use, but also can improve the accuracy of non-destructive testing for defect inspection with the prefabricated part as a standard part, improve the accuracy of the relationship between defects and the performance of the workpiece, and improve the accuracy of the relationship between defects and the service life of the workpiece. Moreover, when performing non-destructive testing of a prefabricated part, the sensitivity of the defects of the prefabricated part at different depth is required to be tested under that same non-destructive testing conditions, partition of defects enables that the defects would be generated at specific depths in one prefabricated part and would not be generated at the other depth, which can effectively avoid the impact on the sensitivity of the test due to the differences in composition and uniformity of different workpieces, improving the accuracy of testing, the impact of different defect features of different structures on the results of non-destructive testing can be analyzed, and the impact of defects at different position and under different environmental (temperate, stress) conditions on the performance of the prefabricated part can be analyzed. On the other hand, when preparing a prefabricated part with specified defect position and features (such as proportion, size and intensity), the defect preparation process to be used is determined by the amount and size of the defect area. If a plurality of defect areas are provided, it is necessary to set forming strategies (such as the amount of forming laser heat, the sequence of forming, path planning of forming, layer separation, etc.) of different defect proportion for each defect area.

As shown in FIG. 3, in one or more embodiments, the method for preparing a prefabricated part with built-in crack defects further comprises, S103: process the models of the defect area 10 and the forming areas 11 separated from the 3D model, where model processing comprises: allowance addition processing, layer separation and cutting processing and path planning processing. Specifically, the allowance addition processing is to add printing allowance to the outer peripheral contour to the defect area 10 and the forming area 11 respectively, so that the boundary of the defect area 10 and the forming area 11 could be bonded with each other by fusion, where the metallurgical bonding could be achieved by the boundary of the molten pool of the two areas overlapping with each other or the melting deposition of the upper and lower layers of the two areas. The layer separation and cutting processing is to separate the 3D model obtained by scanning into multiple layers by cutting, providing the basis for the printing layer by layer subsequently. The path planning processing is to plan the laser scanning path for each single layer obtained after the layer separation and cutting processing. Different powder feeders and laser generators can be used for the defect area 10 and the forming area 11 in each single layer, the defect area 10 and the forming area 11 can be printed subsequently or simultaneously.

In one or more embodiments, the method for preparing a prefabricated part with built-in crack defects further comprises S105: heat treatment of the printed prefabricated part 1, specifically, could be stress relief heat treatment or structure regulation solution treatment.

In one or more embodiments, the method for preparing a prefabricated part with built-in crack defects further comprises S106: remove the printed prefabricated part 1 from substrates, in some embodiments, the prefabricated part 1 is printed on the substrates, so the prefabricated part 1 needs to be removed from the substrates by some method such as wire cutting after being printed. In other embodiments, the prefabricated part 1 is not printed on the substrates, then the step in S106 is not required.

In one or more embodiments, the method for preparing a prefabricated part with built-in crack defects further comprises S107: surface treatment of the printed prefabricated part 1, specifically, the prefabricated part 1 could be polished or machined to satisfy the requirement of surface quality of the workpiece.

In one or more embodiments, the powder for forming in the art refers to the metal powder prepared by standard process and having standard chemical and physical properties, and the relevant process parameters refer to the standard parameters in industry used for printing of the powder for forming, so the prefabricated part prepared with the powder for forming and the relevant process parameters would hardly generate or generate less amount of defects such as cracks. In one embodiment, the powder material having a composition similar to or the same as the defect preparation powder used for preparing the defect area 10 is normally selected as the standard powder, so as to ensure the bonding between the defect area 10 and the forming area 11.

A specific example of preparing a prefabricated part with built-in crack defects by the method described in the first embodiment is shown as follows, referring to FIG. 1 to FIG. 3:

Hastelloy X alloy powder is selected to be the preparation powder for the forming area 11.

Firstly, define the position of the prefabricated crack defect area on the prefabricated part 1 as the center of the workpiece, the area is a rectangular area with a size of 15 mm×7 mm×5 mm, and the proportion of crack defects in the rectangular area is set to be about 0.2%-0.3%.

Subsequently, based on the position and the size of the built-in crack defects, separate the prefabricated defect area from the 3D model of the additive manufacturing workpiece by UG modeling software, forming the defect area 10 and the forming area 11 inside the prefabricated part 1.

Subsequently, perform the layer separation and cutting processing and path planning processing on the inner prefabricated crack defect area and the outer forming area of the prefabricated part 1, where the boundary of the molten pool of the two areas would overlap with each other so that metallurgical bonding could be achieved at the boundary. Subsequently, fill the prefabricated crack defect area inside the prefabricated part by the method of laser melting deposition additive manufacturing based on synchronous powder feeding, the powder used is the GH3536 high-temperature alloy powder prepared by the plasma rotating electrode atomization method, where the weight percentages of the main chemical elements are: Ni:46%, C:0.075%, Cr:22.0%, Co:1.5%, Mo: 9.5%, W:0.7%, Fe:19.0%, Mn≤0.01%, Si≤0.1%, P≤0.008%, S≤0.0015%, O≤0.015%, N≤0.005%, and the rest are other trace elements, particle size: 45 μm~150 μm, the proportion of spherical powder with a smooth surface is 95% and almost no hollow powder. The process parameters of defect preparation are: laser power of 550 W, scanning rate of 600 mm/min, powder feeding rate of 12 g/min, spot diameter of 1.2 mm, scanning spacing of 0.8 mm and layer thickness of 0.2 mm, so the prefabricated crack defect area of the current layer is formed, and then the surrounding forming area of the current layer could be formed using another powder feeder with the normal forming process parameters for the forming area.

Subsequently, heat treatment and structure regulation solution treatment are performed according to the requirement of the workpiece, specifically, the process of heat treatment is: using a vacuum heat treatment furnace, with the rate of heat treatment being 1175° C./1 h, cooling in furnace.

Subsequently, remove the workpiece with prefabricated defects prepared by additive manufacturing from the substrates by means of wire cutting.

Finally, the workpiece prepared by additive manufacturing is machined to satisfy the requirement of surface quality of the workpiece, Ra≤0.8 μm.

After testing, the proportion of the crack defects of the prefabricated defect area prepared by this method is about 0.25% and the width of the crack is <45 μm.

Figure 4:
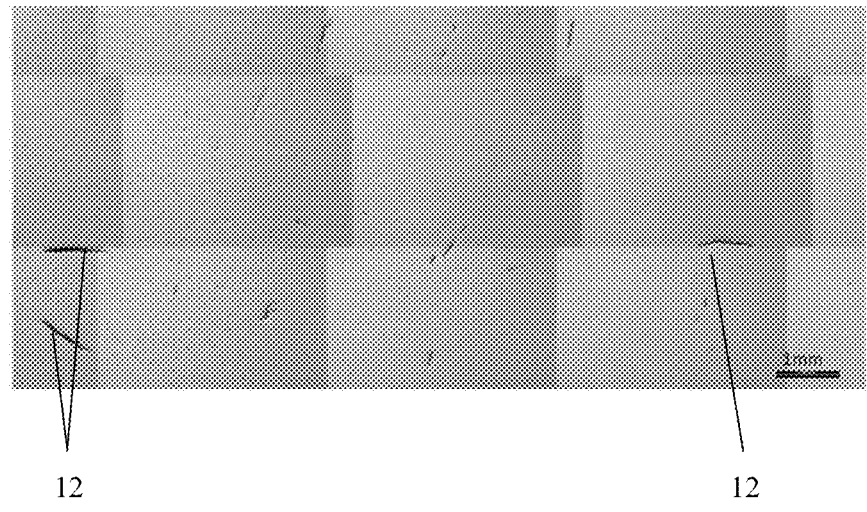
FIG. 4 shows the polished metallographic morphology of the crack defects on the prefabricated part prepared in one embodiment.

FIG. 4 shows the polished metallographic morphology of the crack defects on the prefabricated part prepared by the method mentioned above, the prefabricated part prepared by the method mentioned above is provided with a plurality of cracks 12 that are generated naturally, and the structure of the two sides of the plurality of cracks 12 has the feature of corresponding continuity.

The Second Embodiment

The second embodiment shows a method for preparing a repaired part with built-in crack defects.

Figure 5:
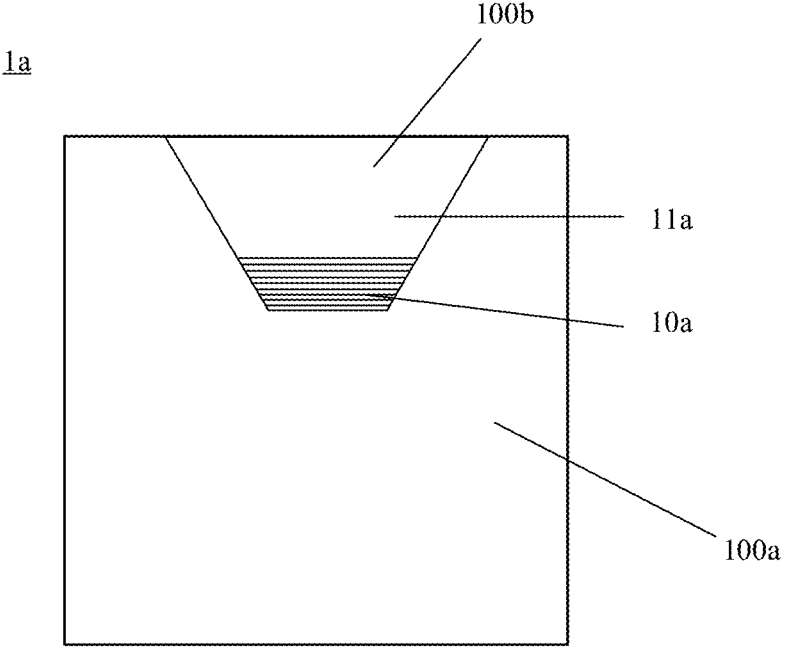
FIG. 5 schematically shows a schematic view of the cross section of the defect area of the repaired part with built-in crack defects in another embodiment.
Figure 6:
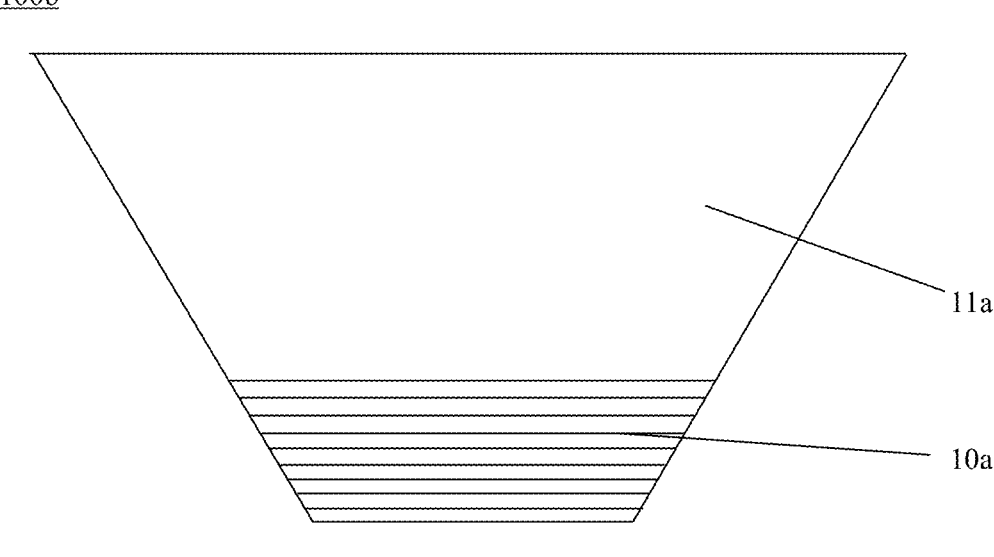
FIG. 6 shows a schematic view of the cross section of the repair area
Figure 7:
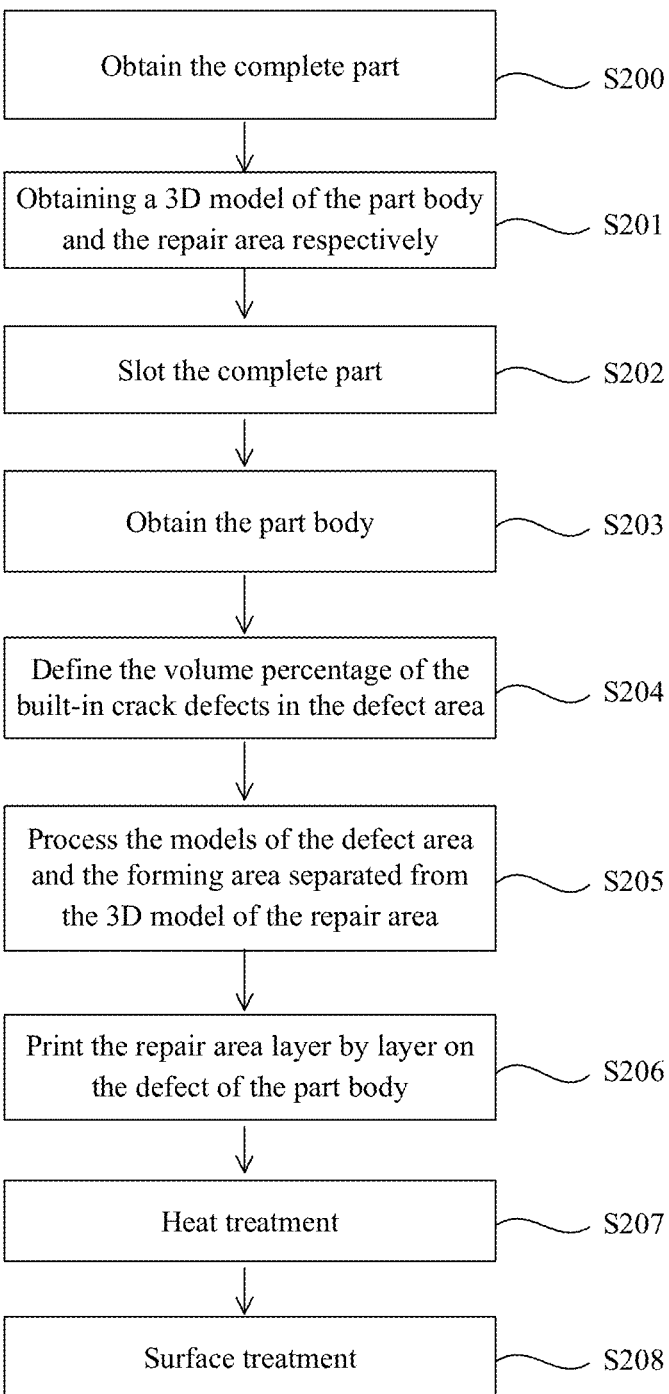
FIG. 7 shows a flow chart of the method for preparing the repaired part shown in FIG. 5.

FIG. 5 schematically shows a schematic view of the cross section of the defect area of the repaired part with built-in crack defects in this embodiment. In this embodiment, the repaired part 1a comprises a part body 100a and a repair area 100b, the repair area 100b is used to repair the defect of the part body 100a. FIG. 6 shows a schematic view of the cross section of the repair area 100b. FIG. 7 shows a flow chart of the method for preparing the repaired part shown in FIG. 5.

In order to prepare the repaired part 1a, firstly execute S201: obtain a 3D model of the repair area 100b based on the defect or damage of the part body 100a, wherein the 3D model of the repair area 100b can be obtained by means of 3D scanning etc., the 3D model can be created in 3D graphics processing software such as UG, AUTOCAD or other modeling software, and separated in the software.

Subsequently, execute S203: obtain the part body 100a, specifically, in the embodiment as shown in FIG. 5, the defects of the part body 100a could be casting defects, machining defects or service defects such as cracks, notches, etc., and the repair area 100b is a repairing part provided corresponding to the notches. Therefore, the preparation method as shown in FIG. 7 further comprises the steps of: S200, obtain the complete part, and S202: slot the complete part, so as to turn to S203 to obtain the part body 100a. The complete part can be a part that has been aged after use, and the part body 100a is obtained by slotting the damaged portion on the aged part. The complete part can also be obtained by other means such as additive manufacturing. The slot could be in a trapezoidal shape as shown in the figure, or in other suitable shapes such as a U shape or a V shape, wherein the inclined angles of the sides of the slot is generally less than 60°, and the edges between the sides and bottom are chamfered. In an embodiment different from the steps shown in FIG. 7, the part body 100a can also be formed directly by additive manufacturing, where the defects to be repaired would be formed simultaneously on the part body 100a when printing.

Subsequently, as shown in FIG. 6, separate the 3D model of the repair area into at least one defect area 10a and one forming area 11a, in the case shown in FIG. 5 where the part has been repaired, the defect area 10a is located inside the repaired part 1a. Specifically, the defect area 10a is located at the position shown in the figure, which is at the downstream of the repairing direction of the repair area 100b, so that when finishing repairing, the defect area 10a is located inside the repaired part 1a. In some other embodiments different from the one shown in the figure, the defect area 10*a* could be provided directly inside the forming area 11*a*.

Subsequently, execute S204, define the volume percentage of the built-in crack defects in the defect area 10*a*, the volume percentage can be determined by the ratio of the volume of the built-in crack defects in the actual repaired part that needs to be simulated to the volume of the actual repaired part, that is (the volume of the built-in crack defects/the volume of the defect area)*the volume of the defect area/the volume of the prefabricated part=the volume of the built-in crack defects in the actual repaired part/the volume of the actual repaired part. The proportion of spherical powder, the proportion of hollow powder and process parameters of defect preparation can be adjusted according to the volume percentage of the defects.

Subsequently, execute S206: print the repair area 100*b* layer by layer on the defect of the part body 100*a*, wherein for the layers relative to the defect area 10*a*, the defect preparation powder and the process parameters of defect preparation are used to print the specific layers in the defect area, and the powder for forming and relevant process parameters are used to print the specific layers in the forming area 11*a*. In one embodiment, printing allowance needs to be added to the outer peripheral contour of the repair area 100*b* before printing, so as to achieve the strong metallurgical bonding between the repair area 100*b* and the part body.

Specifically, the particle size of the defect preparation powder is between 45 μm and 150 μm, wherein the proportion of spherical powder≥93% and the proportion of hollow powder<0.5%. In one embodiment, the defect preparation powder is prepared by the plasma rotating electrode atomization method.

The process parameters of defect preparation comprise: laser power of 450 W-550 W, scanning rate of 600 mm/min-1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

The volume percentage of the crack defects in the defect area is controlled by adjusting the process parameters of defect preparation. Specifically, in one embodiment, the volume percentage of the crack defects in the defect area is controlled by adjusting the ratio of the laser power to the scanning rate. In another embodiment, the method of adjusting the process parameters of defect preparation is determined by trial and error, for example, the parameter A is adjusted in the N+1th test, the volume percentage of the crack defects prepared in the N+1th test tends to increase compared to the volume percentage of the crack defects prepared in the Nth test, therefore the calibrated volume percentage can be obtained by adjusting the parameter A continuously. In another embodiment, a parameter database can also be provided to record the change in the proportion of the crack defects after each time the process parameters of defect preparation is adjusted, so that a certain proportion of the crack defects can be obtained by referring to the database to adjust the process parameters of defect preparation.

In one or more embodiments, the method for preparing a prefabricated part with built-in crack defects further comprises, S205: process the models of the defect area 10*a* and the forming area 11*a* separated from the 3D model of the repair area 100*b*, where model processing comprises: allowance addition processing, layer separation and cutting processing and path planning processing. Specifically, the allowance addition processing is to add printing allowance to the outer peripheral contour to the defect area 10*a* and the forming area 11*a* separately, so that the boundary of the defect area 10*a* and the forming area 11*a* could be bonded with each other by fusion, where the metallurgical bonding could be achieved by the boundary of the molten pool of the two areas overlapping with each other or the melting deposition of the upper and lower layers of the two areas. The layer separation and cutting processing is to separate the 3D model obtained by scanning into multiple layers by cutting, providing the basis for the printing layer by layer subsequently. The path planning processing is to plan the laser scanning path for each single layer obtained after the layer separation and cutting processing. Different powder feeders and laser generators can be used for the defect area 10*a* and the forming area 11*a* in each single layer, the defect area 10*a* and the forming area 11*a* can be printed subsequently or simultaneously.

In one or more embodiments, the method for preparing a prefabricated part with built-in crack defects further comprises S207: heat treatment of the printed repaired part 1*a*, specifically, could be stress relief heat treatment or structure regulation solution treatment.

In one or more embodiments, the method for preparing a prefabricated part with built-in crack defects further comprises S208: surface treatment of the printed prefabricated part, specifically, the repaired part 1*a* could be polished or machined to satisfy the requirement of surface quality of the workpiece.

In one or more embodiments, the powder for forming in the art refers to the metal powder prepared by standard process and having standard chemical and physical properties, and the relevant process parameters refer to the standard parameters in industry used for printing of the powder for forming, so the prefabricated part prepared with the powder for forming and the relevant process parameters would hardly generate or generate less amount of defects such as cracks. In one embodiment, the powder material having a composition similar to or the same as that of the defect preparation powder used for preparing the defect area 10*a* is normally selected as the standard powder, so as to ensure the bonding between the defect area 10*a* and the forming area 11*a*.

A specific example of preparing a repaired part 1*a* with built-in crack defects by the method described in the second embodiment is shown as follows, referring to FIG. 5 to FIG. 7:

GH3536 alloy powder is selected to be the preparation powder for the repair area. Firstly, slot the damaged portion where the notch locates on the GH3536 forged piece by machining, the shape of the slot is shown in FIG. 5, which is a trapezoidal slot with inclined angles of the slot sides of about 45° and a size of 17 mm of upper line, 10 mm of lower line, 7 mm in height and 7 mm in width, obtaining the part body 100*a*. Subsequently, obtain the 3D model of the repair area 100*b* by 3D scanning on the slotted area, Subsequently, set the vertical distance between the upper surface of the crack defect area 10*a* and the surface of the part body 100*a* of the GH3536 forged piece to be 17 mm, as shown in FIG. 5, and set the proportion of the crack defects of the prefabricated defect area 10*a* to be about 1.45%-1.55%.

Subsequently, based on the position and proportion of the prefabricated crack defects, separate the 3D model of the trapezoidal slot into lower defect area 10*a* and upper forming area 11*a* by CAD modeling software.

Subsequently, perform the layer separation and cutting processing and path planning processing on the inner prefabricated crack defect area and the outer forming area of the repaired part 1a, where the boundary of the molten pool of the two areas would overlap with each other so that metallurgical bonding could be achieved at the boundary. Add printing allowance to the obtained 3D model of the prefabricated defect area, add printing allowance of about half a spot diameter to the inclined sides of the trapezoidal slot, so that the sides of the trapezoidal slot and the part body could be overlapped and strongly bonded with each other, where the layer separation and cutting processing and path planning processing could then be performed on the 3D models of the lower prefabricated crack defect area and the upper forming area.

Subsequently, fill the prefabricated crack defect area inside the prefabricated part by the method of laser melting deposition additive manufacturing based on synchronous powder feeding, the powder used is the GH3536 high-temperature alloy powder prepared by the plasma rotating electrode atomization method, where the weight percentages of the main chemical elements are: Ni:49%, C:0.085%, Cr:22.5%, Co:2.0%, Mo:8.5%, W:0.5%, Fe:17.0%, Mn≤0.01%, Si≤0.1%, P≤0.008%, S≤0.0015%, O≤0.015%, N≤0.005%, and the rest are other trace elements, particle size: 45 μm~150 μm, the proportion of spherical powder with a smooth surface is 95% and almost no hollow powder. The process parameters of defect preparation are: laser power of 450 W, scanning rate of 1200 mm/min, powder feeding rate of 4 g/min, spot diameter of 1 mm, scanning spacing of 0.5 mm and layer thickness of 0.08 mm. When filling up to the predetermined height, the formation of the prefabricated crack defect area is completed, and then the upper forming area of the workpiece would be formed using the normal process parameters of forming.

Subsequently, vacuum stress relief heat treatment is performed, with the rate of heat treatment being 650° C./4 h, cooling in furnace.

Finally, the surface of the prefabricated defect area prepared by additive manufacturing is polished to satisfy the requirement of surface quality of the workpiece, m. After testing, the proportion of the crack defects of the prefabricated defect area of the repaired part on the GH3536 forged piece prepared by the laser melting deposition method is about 1.50% and the width of the crack is <50 μm.

Figure 8:
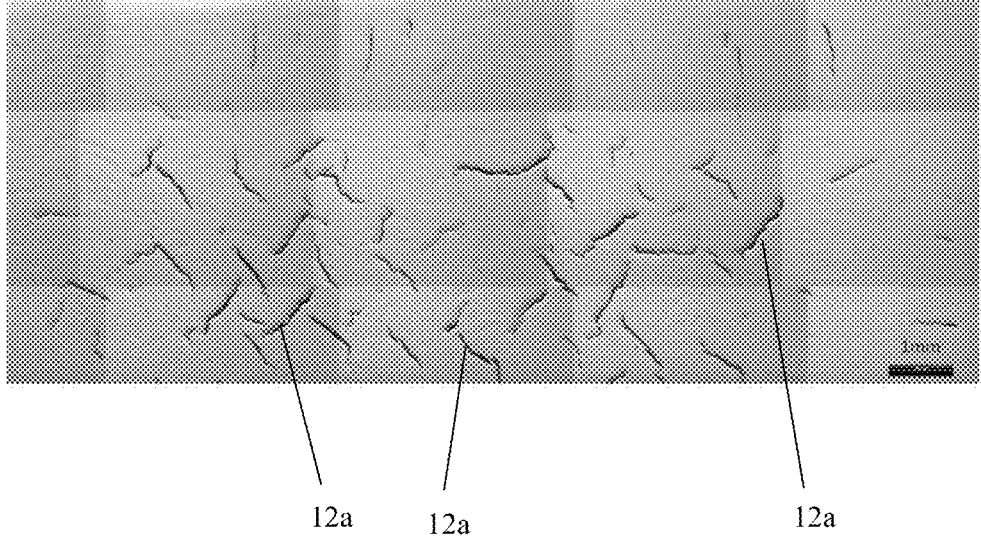
FIG. 8 shows the polished metallographic morphology of the crack defects on the prefabricated part prepared in another embodiment.

FIG. 8 shows the polished metallographic morphology of the crack defects on the prefabricated part prepared by the method mentioned above, the prefabricated part prepared by the method mentioned above is provided with a plurality of cracks 12a that are generated naturally, and the structure of the plurality of cracks 12a has the feature of continuity. As the ratio of the laser power to the powder feeding rate in the second embodiment is smaller than that in the first embodiment, more crack defects are shown in FIG. 8 than in FIG. 4

Simulation of crack defects inside the repaired part with built-in crack defects is achieved in the embodiment mentioned above, so that the repaired part with crack defects generated naturally can be obtained, to further analyze the relationship between the built-in crack defects and the reliability of the repaired part prepared by additive manufacturing, providing a strong theoretical support for the application of metallic additive manufacturing formation, which has a broad research and application prospect.

Although the preferred embodiments of the present invention is disclosed as above, it is not intended to limit the present invention. Any person skilled in the art can make possible changes and modifications without departing from the spirit and scope of the present invention. Therefore, any modifications, equivalent changes and embellishment made to the above embodiments without departing from the technical solution of the present invention based on the technical essence of the present invention are within the protection scope defined by the claims of the present invention.

The invention claimed is:

1. A method for preparing prefabricated crack defects, comprising:
    defining a defect area,
    defining a volume percentage of the crack defects in the defect area,
    adjusting a proportion of spherical powder, a proportion of hollow powder and process parameters of defect preparation according to the volume percentage of the crack defects,
    based on a technique of laser melting deposition, and printing the defect area layer by layer by using a defect preparation powder comprising the spherical powder and the hollow powder and using the process parameters of defect preparation,
    wherein a particle size of the defect preparation powder is between 45 μm and 150 μm, the proportion of spherical powder≥93% and the proportion of hollow powder<0.5%,
    the process parameters of defect preparation comprising: laser power of 450 W-550 W, scanning rate of 600 mm/min-1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

2. The method for preparing the prefabricated crack defects according to claim 1, wherein,
    the volume percentage of the crack defects in the defect area is controlled by adjusting a ratio of the laser power P to the scanning rate v,
    wherein the ratio of P/v decreases, the volume percentage of the crack defects in the defect area would increase.

3. A method for preparing a prefabricated part with built-in crack defects, based on a technique of laser melting deposition, comprising:
    obtaining a 3D model of the prefabricated part,
    separating the prefabricated part into at least one defect area and one forming area, where the defect area is provided inside the prefabricated part,
    defining a volume percentage of the built-in crack defects in the defect area,
    adjusting a proportion of spherical powder, a proportion of hollow powder and process parameters of defect preparation according to the volume percentage of the crack defects,
    printing the prefabricated part with built-in crack defects layer by layer, where a defect preparation powder comprising the spherical powder and the hollow powder and the process parameters of defect preparation are used to print layers of the defect area,
    wherein a particle size of the defect preparation powder is between 45 μm and 150 μm, wherein the proportion of spherical powder≥93% and the proportion of hollow powder<0.5%,
    the process parameters of defect preparation comprising: laser power of 450 W-550 W, scanning rate of 600 mm/min-1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

4. The method for preparing the prefabricated part with built-in crack defects according to claim 3, wherein, the 3D model of the prefabricated part is separated into a plurality of defect areas and forming area, wherein the proportion of spherical powder, the proportion of hollow powder and the process parameters of defect preparation are set separately for each defect area.

5. The method for preparing the prefabricated part with built-in crack defects according to claim 3, wherein, the volume percentage of the crack defects in the defect area is controlled by adjusting a ratio of the laser power P to the scanning rate v, wherein the ratio of P/v decreases, the volume percentage of the crack defects in the defect area would increase.

6. The method for preparing the prefabricated part with built-in crack defects according to claim 3, further comprising:

processing the 3D models of the defect area and the forming area, where model processing comprises:

allowance addition processing, layer separation and cutting processing, and path planning processing.

7. The method for preparing the prefabricated part with built-in crack defects according to claim 3, further comprising:

heat treatment of the printed prefabricated part, removing the printed prefabricated part from substrates, and surface treatment of the printed prefabricated part.

8. A prefabricated part with built-in crack defects, wherein, the prefabricated part is prepared by the method according to claim 3.

9. A method for preparing a repaired part with built-in crack defects, based on a technique of laser melting deposition, the repaired part comprises a part body and a repair area, the repair area is used to repair a defect or damage of the part body, the method is comprising:

obtaining a 3D model of the part body and the repair area respectively, obtaining the part body, separating the 3D model of the repair area into at least one defect area and one forming area, where the defect area would be provided inside the repaired part after being repaired, defining a volume percentage of the built-in crack defects in the defect area, adjusting a proportion of spherical powder, a proportion of hollow powder and process parameters of defect preparation according to the volume percentage of the crack defects, printing the repair area on the defect of the part body layer by layer, where a defect preparation powder comprising the spherical powder and the hollow powder and the process parameters of defect preparation are used to print layers of the defect area, wherein a particle size of the defect preparation powder is between 45 μm and 150 μm, wherein the proportion of spherical powder≥93% and the proportion of hollow powder<0.5%, the process parameters of defect preparation comprising: laser power of 450 W-550 W, scanning rate of 600 mm/min-1200 mm/min, powder feeding rate of 4 g/min-12 g/min, spot diameter of 1 mm-1.2 mm, scanning spacing of 0.5 mm-0.8 mm and layer thickness of 0.08 mm-0.2 mm.

10. The method for preparing the repaired part with built-in crack defects according to claim 9, wherein, the volume percentage of the crack defects in the defect area is controlled by adjusting the ratio of a laser power P to the scanning rate v, wherein the ratio of P/v decreases, the volume percentage of the crack defects in the defect area would increase.

11. The method for preparing the repaired part with built-in crack defects according to claim 9, wherein the defect of the part body includes casting defects, machining defects or service defects, and the method further comprises:

slotting a complete part to obtain the part body.

12. The method for preparing the repaired part with built-in crack defects according to claim 9, further comprising:

processing the 3D models of the defect area and the forming area of the repair area, where model processing comprises:

allowance addition processing, layer separation and cutting processing, and path planning processing.

13. The method for preparing the repaired part with built-in crack defects according to claim 9, further comprising:

heat treatment of the printed repaired part, and surface treatment of the printed repaired part.

* * * * *